United States Patent
Tsai

(10) Patent No.: US 11,230,141 B2
(45) Date of Patent: Jan. 25, 2022

(54) MARKED WHEEL RIM AND METHOD FOR MANUFACTURING THE SAME

(71) Applicant: MARSHAL INDUSTRIAL CORP., Tortola (VG)

(72) Inventor: Ming-Jen Tsai, Miaoli County (TW)

(73) Assignee: MARSHAL INDUSTRIAL CORP., Tortola (VG)

( * ) Notice: Subject to any disclaimer, the term of this patent is extended or adjusted under 35 U.S.C. 154(b) by 662 days.

(21) Appl. No.: 16/108,939

(22) Filed: Aug. 22, 2018

(65) Prior Publication Data

US 2020/0062028 A1   Feb. 27, 2020

(51) Int. Cl.
| | |
|---|---|
| *B60B 7/00* | (2006.01) |
| *B60B 21/00* | (2006.01) |
| *B44C 1/17* | (2006.01) |
| *B65C 7/00* | (2006.01) |

(52) U.S. Cl.
CPC .......... *B60B 7/0053* (2013.01); *B44C 1/1712* (2013.01); *B60B 7/0006* (2013.01); *B60B 21/00* (2013.01); *B65C 7/00* (2013.01); *B60B 2310/656* (2013.01); *B60B 2900/113* (2013.01); *B60B 2900/572* (2013.01)

(58) Field of Classification Search
CPC ............ B60B 7/0053; B60B 2310/656; B60B 2900/572; B60B 21/00; B60B 7/0006; B60B 2900/113; B29C 70/30; G09F 21/045; G09F 3/10; B44C 1/1712; B65C 7/00

See application file for complete search history.

(56) References Cited

U.S. PATENT DOCUMENTS

| | | | | |
|---|---|---|---|---|
| 3,481,652 A | * | 12/1969 | Mazerolle | B60B 7/00 301/37.26 |
| 4,314,964 A | * | 2/1982 | Ferrary | B29C 45/0013 264/501 |
| 6,030,050 A | * | 2/2000 | Ichikawa | B60B 7/04 301/37.109 |
| 6,443,531 B1 | * | 9/2002 | Hogan | B60B 7/0053 301/37.34 |
| 7,258,402 B2 | * | 8/2007 | Meggiolan | B29C 70/446 301/95.103 |
| 7,350,877 B1 | * | 4/2008 | Muraoka | B60B 1/041 301/58 |
| 8,002,362 B2 | * | 8/2011 | Colegrove | B60B 5/02 301/95.103 |
| 8,070,235 B2 | * | 12/2011 | Reuteler | B60B 25/00 301/95.103 |
| 9,242,421 B2 | * | 1/2016 | Tsai | B60B 5/02 |
| 10,717,321 B2 | * | 7/2020 | Yokozawa | B05B 12/30 |
| 10,723,172 B2 | * | 7/2020 | Walls-Bruck | B60B 21/028 |
| 2005/0040697 A1 | * | 2/2005 | Carmona | B60B 7/18 301/95.101 |

(Continued)

*Primary Examiner* — Scott A Browne
(74) *Attorney, Agent, or Firm* — Muncy, Geissler, Olds & Lowe, P.C.

(57) ABSTRACT

A marked wheel rim is provided, including: a rim body and a mark. The rim body includes an outer surface. The mark is embedded on the outer surface and includes an outer peripheral edge adjacent to the rim body. The outer peripheral edge is non-protrusive beyond the outer surface. A method for manufacturing the marked wheel rim is further provided.

3 Claims, 4 Drawing Sheets

(56) References Cited

U.S. PATENT DOCUMENTS

2011/0115280 A1\* 5/2011 Mercat .................... B60B 7/063
301/55
2015/0096672 A1\* 4/2015 Tsai ...................... B29C 70/545
156/242

\* cited by examiner

MARKED WHEEL RIM AND METHOD FOR MANUFACTURING THE SAME

BACKGROUND OF THE INVENTION

Field of the Invention

The present invention relates to a marked wheel rim and method for manufacturing the same.

Description of the Prior Art

Generally, marks or decorations of a wheel rim and a frame of a bicycle are processed by water transfer printing, such as non-film transfer, after the wheel rim or the frame is finished. A conventional marking process includes following steps: softening a sticker by immersing in water; adhering the sticker to a target position; removing residual air and water between the sticker and the target position; wiping water and glue on an surface of the sticker; drying the labeled position completely by heating at low temperature. The marking process is complicated and time-consuming, and the marks protrude beyond a surface of the wheel rim.

The present invention is, therefore, arisen to obviate or at least mitigate the above-mentioned disadvantages.

SUMMARY OF THE INVENTION

The main object of the present invention is to provide a marked wheel rim and method for manufacturing the same, which have simple structure of the mark and steps.

To achieve the above and other objects, the present invention provides a marked wheel rim, including: a rim body and a mark. The rim body includes an outer surface. The mark is embedded on the outer surface and includes an outer peripheral edge abutting against the rim body. The outer peripheral edge is non-protrusive beyond the outer surface.

To achieve the above and other objects, the present invention provides a method of manufacturing the marked wheel rim described above, including following steps of: preparing a mold, the mold including an inner surface; placing the rim body and the mark in the mold, wherein the mark is disposed between the outer surface of the rim body and the inner surface of the mold; combining the mark and the rim body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
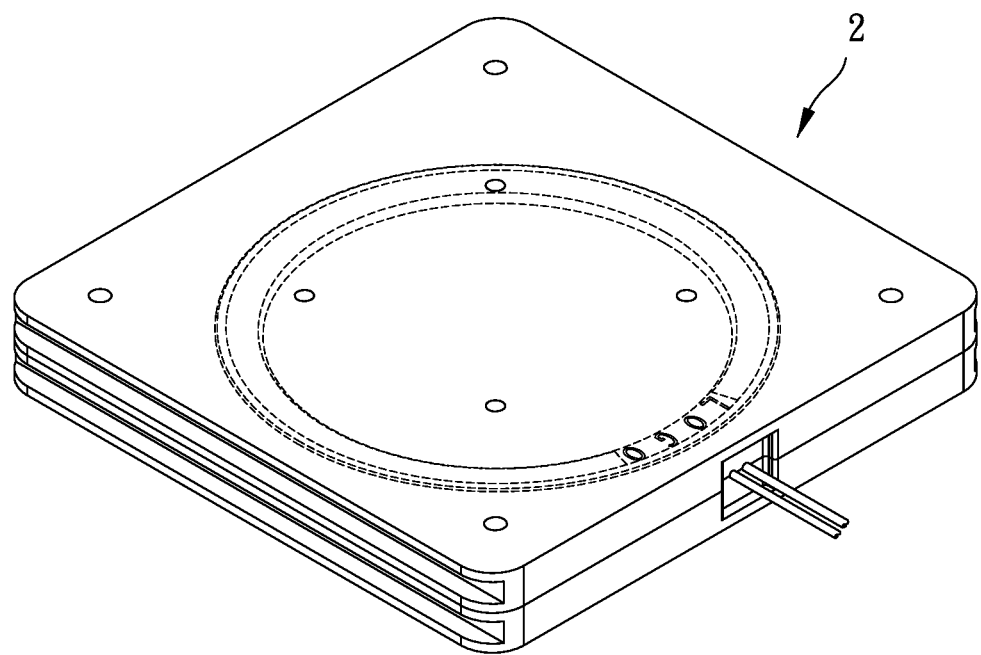
FIG. 1 is a stereogram of a preferable embodiment of the present invention.
Figure 2:
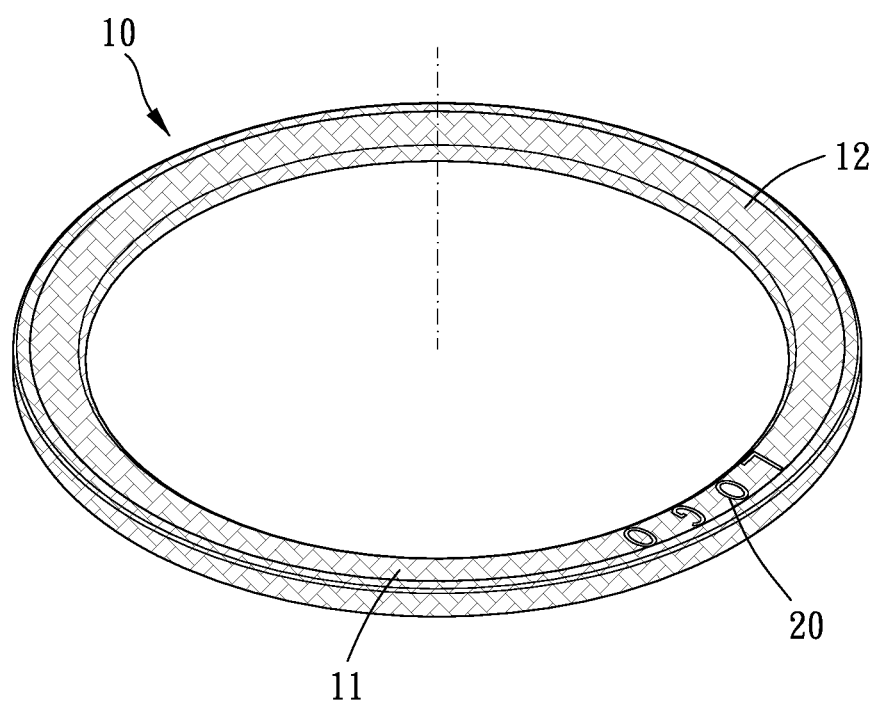
FIG. 2 is a stereogram of a wheel rim of a preferable embodiment of the present invention.
Figure 3:
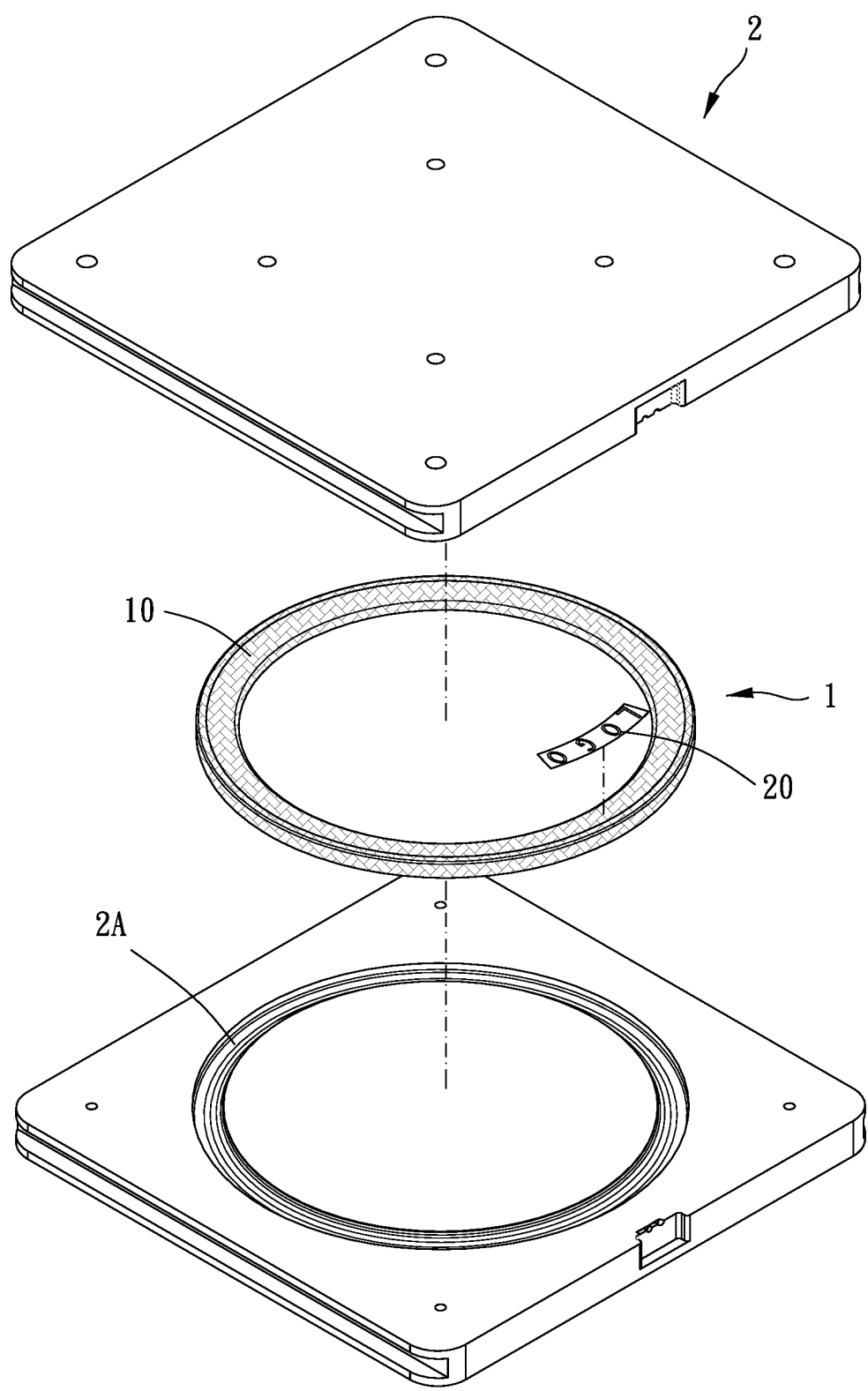
FIG. 3 is a breakdown drawing of a preferable embodiment of the present invention.
Figure 4:
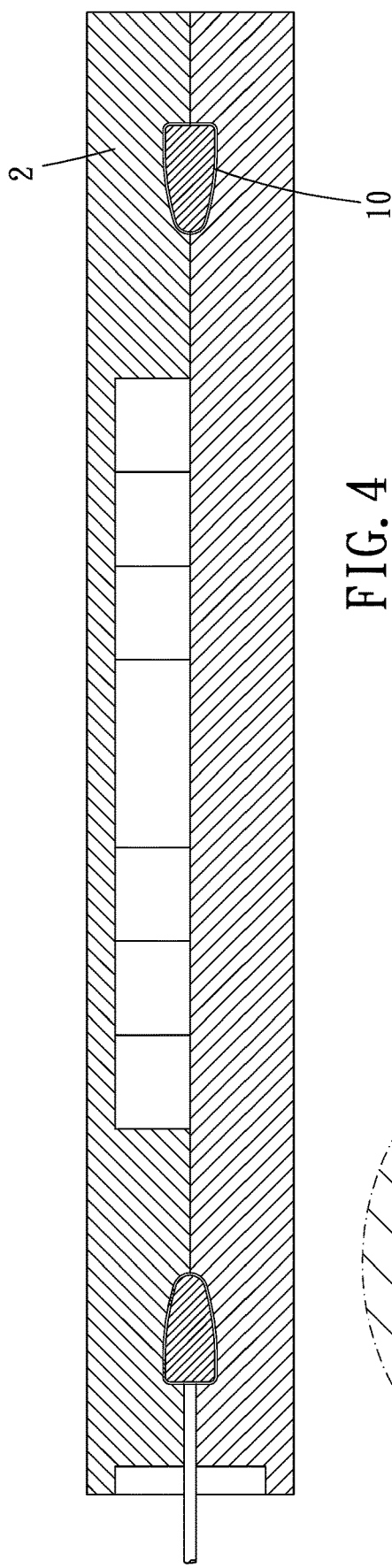
FIG. 4 is a cross-sectional view of FIG. 1.
Figure 5:
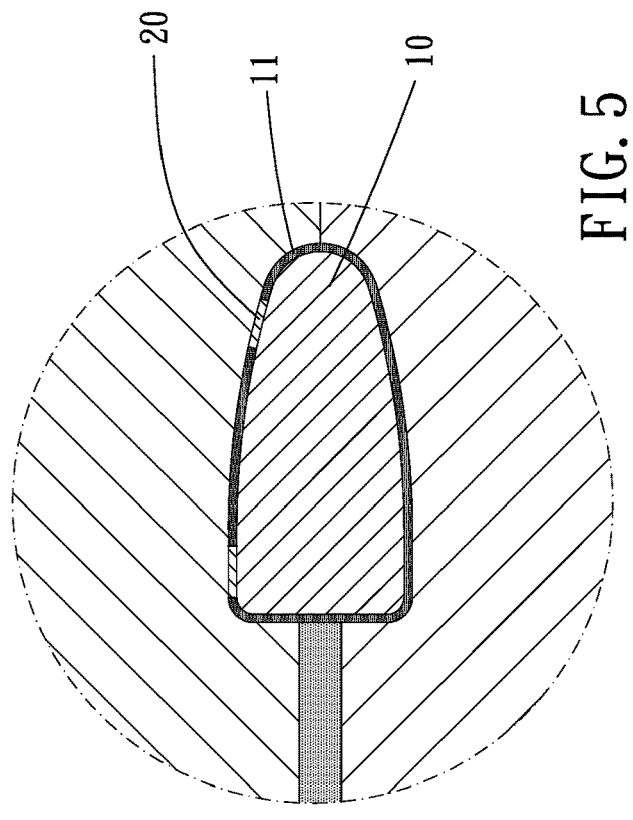
FIG. 5 is a partial enlargement of FIG. 4.
Figure 6:
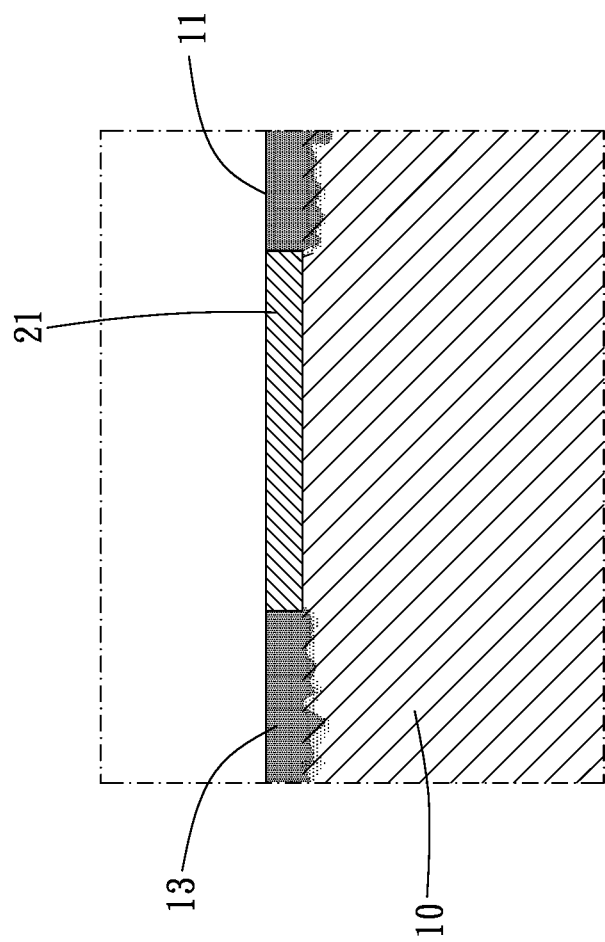
FIG. 6 is a partial enlargement of FIG. 5.

Please refer to FIGS. 1 to 6 for a preferable embodiment of the present invention. A marked wheel rim 1 of the present invention includes a rim body 10 and a mark 20.

The rim body 10 includes an outer surface 11. The mark 20 is embedded on the outer surface 11 and includes an outer peripheral edge 21 abutting against the rim body 10. The outer peripheral edge 21 is non-protrusive beyond the outer surface 11 so that the marked wheel rim 1 has a smooth surface and a preferable appearance and the mark 20 is not easy to deform or peel off.

The rim body 10 includes a plurality of fibers 12 and a binding material 13 which binds the plurality of fibers 12 and forms the outer surface 11. The plurality of fibers 12 may include, for example, carbon fibers, glass fibers and Kevlar fibers. The binding material 13 may be resin which is curable by heating to shape the plurality of fibers 12. However, the rim body may be made of a single material or other composite materials, or formed integrally.

The outer peripheral edge 21 and the outer surface 11 are flush with each other so as to avoid deformation and/or peeling of the mark 20 by external force. In this embodiment, an outer surface of the mark 20 is entirely flush with the outer surface 11 of the rim body 10. The mark 20 is exposed on the outer surface 11. There is color difference between the outer surface 11 and the mark 20, and the color difference may refer to color shade (such as dark and light) or color system (such as red and blue), for recognition. However, the outer peripheral edge may be inwardly lower than the outer surface.

A method of manufacturing the marked wheel rim 1 is further provided, including following steps of: preparing a mold 2, the mold 2 including an inner surface 2A; placing the rim body 10 and the mark 20 in the mold 2, wherein the mark 20 is disposed between the outer surface 11 of the rim body 10 and the inner surface 2A of the mold 2; combining the mark 20 and the rim body 10. Therefore, the mark 20 is rapidly and simply combined with the rim body 10.

In the process of the marked wheel rim 1, the mark 20 is disposed on the rim body 10 or the inner surface 2A before combined with the rim body 10. Preferably, the outer peripheral edge 21 of the mark 20 continuously annularly contacts the inner surface 2A of the mold 2 before the mark 20 is combined with the rim body 10 so as to avoid the binding material 13 overflowing to be within the mark 20 and the mold 2 and stabilize a binding position of the mark 20 to prevent the mark 20 from being crumpled or displaced in the mold 2. Specifically, the mark 20 is combined with the rim body 10 by heating. In this embodiment, the plurality of fibers 12 include dry carbon yarns which are wound around the rim body 10. The mark 20 is disposed on the outer surface 11 of the rim body 10 before combined with the rim body 10. The rim body 10 is placed in the mold 2 and the binding material 13 is injected into the mold 2, and then the rim body 10 is cured and combined with the mark 20 by heating and pressurizing A final product can be obtained without any additional post treatment such as surface processing. However, the plurality of fibers 12 may include fiber materials which are pre-immersed with the binding material 13, and the rim body 10 is simultaneously molded and combined with the mark 20 by heating in the mold 2 so as to simplify the process.

Moreover, the mark may be a sticker with an adhesive layer. The mark may also be combined with the rim body by the binding material. Formation of the mark may also be a difference of roughness or luster between the mark and the rim body, and the difference is produced by contacting a mark structure disposed on the inner surface of the mold with the outer surface of the rim body.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a marked wheel rim, including following steps of:

preparing a mold, the mold including an inner surface;

placing a rim body and a mark in the mold, wherein the mark is a sticker disposed between an outer surface of the rim body and the inner surface of the mold, wherein the rim body includes a binding material having the outer surface;

combining the mark and the rim body so that an outer peripheral edge of the mark is, in an axial direction of the rim body, non-protrusive beyond the outer surface of the binding material, and the mark extends non-annularly on a partial area of the outer surface of the binding material.

2. The method of claim 1, wherein the mark is disposed on the rim body or the inner surface before combined with the rim body.

3. The method of claim 1, wherein the mark is combined with the rim body by heating.

* * * * *